United States Patent
Tahara (10) Patent No.: US 10,060,652 B2
(45) Date of Patent: *Aug. 28, 2018

(54) BOILING-WATER GEOTHERMAL HEAT EXCHANGER AND BOILING-WATER GEOTHERMAL POWER GENERATION EQUIPMENT

(71) Applicant: EST. Inc., Fukuoka-shi, Fukuoka (JP)

(72) Inventor: Shunichi Tahara, Fukuoka (JP)

(73) Assignee: KYOEI DENKI KOGYO CORPORATION, Nagano (JP)

( * ) Notice: Subject to any disclaimer, the term of this patent is extended or adjusted under 35 U.S.C. 154(b) by 183 days.

This patent is subject to a terminal disclaimer.

(21) Appl. No.: 15/107,724

(22) PCT Filed: Dec. 1, 2015

(86) PCT No.: PCT/JP2015/083769
§ 371 (c)(1),
(2) Date: Jun. 23, 2016

(87) PCT Pub. No.: WO2016/132624
PCT Pub. Date: Aug. 25, 2016

(65) Prior Publication Data
US 2016/0363350 A1    Dec. 15, 2016

(30) Foreign Application Priority Data
Feb. 16, 2015   (JP) .................. 2015-028040

(51) Int. Cl.
*F03G 7/04* (2006.01)
*F24J 3/08* (2006.01)
(Continued)

(52) U.S. Cl.
CPC ............... *F24T 10/17* (2018.05); *F01K 7/16* (2013.01); *F01K 25/10* (2013.01); *F01K 27/02* (2013.01);
(Continued)

(58) Field of Classification Search
CPC ............... F03G 7/04; F24J 3/08–3/086; F24J 2003/087–2003/089; Y02E 10/10; Y02E 10/12; Y02E 10/125; Y02E 10/16
(Continued)

(56) References Cited

U.S. PATENT DOCUMENTS 3,782,468 A * 1/1974 Kuwada ............... E21B 43/121
166/265
3,957,108 A * 5/1976 Van Huisen ............ F03G 7/04
165/45

(Continued)

FOREIGN PATENT DOCUMENTS

JP    S49-103122 A    9/1974
JP    S52-122745 A    10/1977
(Continued)

*Primary Examiner* — Laert Dounis
(74) *Attorney, Agent, or Firm* — Heedong Chae; Lucem, PC (57) ABSTRACT

A geothermal heat exchanger includes a water injection pipe installed underground and receiving water supplied from above ground and a steam extraction pipe installed underground and contiguous to the water injection pipe. The steam extraction pipe has a plurality of gushing ports at its lower part, and pressure in the steam extraction pipe is decreased approximately to pressure required by a turbine. The steam extraction pipe is formed such that the diameter of the steam extraction pipe becomes smaller from the lower side of the geothermal region toward the upper side of a ground surface. Water supplied to the water injection pipe becomes high-temperature pressurized water by heat supplied from the geothermal region, and gushes from the (Continued)

gushing ports into the steam extraction pipe in an atomized state, and is then converted into a steam single-phase flow, and allows a power generator to conduct power generation.

8 Claims, 4 Drawing Sheets

(51) Int. Cl.
  *F24T 10/17* (2018.01)
  *F01K 25/10* (2006.01)
  *F01K 27/02* (2006.01)
  *F28D 7/12* (2006.01)
  *F01K 7/16* (2006.01)
(52) U.S. Cl.
  CPC ............... *F03G 7/04* (2013.01); *F24J 3/084* (2013.01); *F28D 7/12* (2013.01); *Y02E 10/125* (2013.01)
(58) Field of Classification Search
  USPC ............................................. 60/641.2–641.6
  See application file for complete search history.

(56) References Cited

U.S. PATENT DOCUMENTS

| | | | |
|---|---|---|---|
| 4,142,108 A | 2/1979 | Matthews | |
| 4,492,083 A * | 1/1985 | McCabe | F03G 7/04 165/45 |
| 5,203,173 A * | 4/1993 | Horton | F03G 7/04 165/45 |
| 7,849,690 B1 | 12/2010 | Lakic | |
| 9,714,643 B2 * | 7/2017 | Tahara | F03G 7/04 |
| 2004/0035110 A1 | 2/2004 | Hildebrand | |
| 2004/0244990 A1 * | 12/2004 | Herr | E21B 43/16 166/370 |
| 2014/0206912 A1 | 7/2014 | Iglesias | |
| 2016/0169211 A1 * | 6/2016 | Tahara | F01K 25/10 60/641.2 |

FOREIGN PATENT DOCUMENTS

| | | | | |
|---|---|---|---|---|
| JP | S60-040787 A | 3/1985 | | |
| JP | S64-007227 B2 | 2/1989 | | |
| JP | H01-232175 A | 9/1989 | | |
| JP | 2004-510920 A | 4/2004 | | |
| JP | 2011-052621 A | 3/2011 | | |
| JP | 2011-169188 A | 9/2011 | | |
| JP | 2012-500925 A | 1/2012 | | |
| JP | WO 2013105468 A1 * | 7/2013 | ............... | F24J 3/081 |
| JP | 2013-164062 A | 8/2013 | | |
| JP | 2013-543948 A | 12/2013 | | |
| JP | 2014-047676 A | 3/2014 | | |
| JP | 2014-084857 A | 5/2014 | | |
| JP | 2014-227962 A | 12/2014 | | |
| JP | 5791836 B1 | 10/2015 | | |
| WO | 2013/115656 A1 | 8/2013 | | |

* cited by examiner

BOILING-WATER GEOTHERMAL HEAT EXCHANGER AND BOILING-WATER GEOTHERMAL POWER GENERATION EQUIPMENT

CROSS REFERENCE TO RELATED APPLICATIONS

This patent application is a U.S. national stage application under 35 U.S.C. § 371 of International Patent Application No. PCT/JP2015/083769 filed on Dec. 1, 2015, which claims the benefit of foreign priority to Japanese Patent Application No. JP 2015-028040 filed on Feb. 16, 2015.

BACKGROUND OF THE INVENTION

Technical Field

The present invention relates to a boiling-water-type geothermal heat exchanger and boiling-water-type geothermal power generation equipment that are capable of efficiently extracting geothermal energy.

Background Art

Geothermal power generation to generate electric power while utilizing geothermal energy uses a high-temperature magma layer as a heat source, and is able to utilize its energy as semi-permanent thermal energy, and does not produce a greenhouse gas in the process of power generation, and hence has attracted attention as an alternative means to fossil fuel in recent years.

In conventional geothermal power generation, boring is conducted at a geothermal region, and electric power is generated by extracting natural steam and hot water present in the geothermal region while utilizing natural pressure. Therefore, the thus extracted steam and hot water contain a large amount of sulfur and other impurities unique to the geothermal region. The impurities adhere to a thermal well, piping, turbines, etc., as scale. The adhesion of scale thereto decreases the output of power generation with the lapse of time, and makes prolonged use difficult.

In order to solve this problem resulting from scale, a technology that adopts a process of extracting hot water by feeding water from the ground and then heating the water with heat supplied from a geothermal region is disclosed by Patent Document 1.

The technology disclosed by Patent Document 1 is concerned with a method for extracting a high-pressure single phase flow extracted by a geothermal heat exchanger installed underground in the form of steam by use of a water separator disposed on the ground, and has a great advantageous effect in that the problem resulting from scale is solved and, in addition, geothermal energy is effectively usable.

With respect to geothermal exchange, the following possible problems will be further mentioned. First, a problem resides in the fact that the power of a high-pressure pump must be increased because of the pressure loss in piping of water fed under the ground and of hot water extracted by obtaining the supply of geothermal energy and in the fact that the diameter of a geothermal heat exchanger is required to be increased in order to raise generating efficiency while restricting the pump power to a low level.

Second, a problem resides in the fact that although the replacement of existing boreholes can be mentioned as one of the advantages brought about by Patent Document 1, boreholes to which replacement is applied are limited by limitations on the diameter of a geothermal heat exchanger. The size of the diameter of a geothermal heat exchanger might be an obstacle even when the replacement etc., of boreholes for a geothermal energy survey and of boreholes being out of service are investigated, besides the replacement of existing boreholes.

In Patent Document 2, as a problem to be solved so that a unit power generation cost is reduced by raising the energy efficiency of a geothermal power generation system and by restraining an increase in cost of pumps and so forth, a steam generating method for geothermal power generation is described in which a liquid is lowered from the ground to a geothermal region and is allowed to absorb heat at the geothermal region, and the pressure of the liquid that has thus absorbed heat is decreased to reach pressure equal to or less than saturated steam pressure in the process of raising the liquid that has absorbed heat from the geothermal region.

PRIOR ART DOCUMENTS

Patent Literature

Patent Document 1: Japanese Published Unexamined Patent Application No. 2011-52621
Patent Document 2: Japanese Published Unexamined Patent Application No. 2014-227962

SUMMARY OF THE INVENTION

Problems to be Solved by the Invention

According to the technology described in Patent Document 2, the pressure of the liquid that has absorbed heat is decreased to reach pressure equal to or less than saturated steam pressure in the process of raising the liquid from the geothermal region, and therefore, in comparison with a case in which pressurized hot water is raised, heat is exchanged among hot water that is discharged from a geothermal heat exchanger, water that is fed thereinto, and an underground low-temperature region, and, as a result, the disadvantage of causing heat loss is somewhat improved.

However, a system is constructed such that high-temperature steam is extracted while passing near the thus fed water and the underground low-temperature region, and therefore a heat exchange between the high-temperature steam and the thus fed water or the underground low-temperature region is required to be restrained as much as possible.

The present invention has been made to solve these problems, and aims to provide a boiling-water-type geothermal heat exchanger and boiling-water-type geothermal power generation equipment that are capable of restraining a heat exchange between high-temperature steam to be extracted and water to be fed or an underground low-temperature region as much as possible and that are capable of lightening the weight of piping.

SUMMARY OF THE INVENTION

Means for Solving the Problems

To solve the aforementioned problems, the boiling-water-type geothermal heat exchanger of the present invention is characterized in that it includes a water injection pipe that is installed underground and to which water is supplied from above ground and a steam extraction pipe that is installed underground so as to be contiguous to the water injection pipe and that has a plurality of gushing ports, and pressure in the steam extraction pipe is decreased approximately to pressure required by a turbine, and high-pressure hot water generated by heat supplied from a geothermal region to water present in the water injection pipe is converted into a steam single-phase flow in the steam extraction pipe present in the ground through the gushing ports, and the steam single-phase flow is extracted onto the ground, and, in the geothermal heat exchanger, the steam extraction pipe is disposed inside the water injection pipe, and is formed such that a diameter of the steam extraction pipe becomes smaller from a lower side of the geothermal region toward an upper side of a ground surface.

Water supplied to the water injection pipe becomes high-temperature pressurized water substantially proportional to a depth from above ground in the lower part of the water injection pipe. Pressure in the steam extraction pipe is decreased approximately to pressure required by the turbine, and therefore high-temperature pressurized water is gushed by its water pressure into the steam extraction pipe through the gushing ports formed in the steam extraction pipe, and is converted into a steam single-phase flow in the steam extraction pipe whose inside has been depressurized, and this steam single-phase flow is extracted onto the ground.

The steam extraction pipe is formed such that the diameter of the steam extraction pipe becomes smaller from the lower side of the geothermal region toward the upper side of the ground surface, and therefore, when the steam single-phase flow rises inside the steam extraction pipe, its speed becomes higher in proportion to an approach to the low-temperature region closer to the ground surface, and a period of time spent in passing therethrough is shortened. The flow velocity achieved when steam rises therein becomes higher in inverse proportion to the square of the diameter of the steam extraction pipe, whereas the period of transit time required for the rise of steam becomes shorter in proportion to the square of the diameter of the steam extraction pipe. Additionally, the contact area with the water injection pipe that is an outer pipe becomes smaller in proportion to the diameter of the steam extraction pipe, and therefore the amount of heat that is thermally exchanged with the water injection pipe that is an outer pipe becomes smaller in proportion to the cube of the diameter of the steam extraction pipe that is an inner pipe, and therefore it is possible to reduce heat loss suffered when the steam single-phase flow passes through the low-temperature region.

Additionally, if the steam extraction pipe that is an inner pipe is attached after the water injection pipe that is an outer pipe is installed, it is possible to make the weight of the steam extraction pipe smaller than in a case in which the steam extraction pipe is formed so as to have the same diameter as its own diameter on the lower side of the geothermal region because the diameter of the steam extraction pipe becomes smaller from the lower side of the geothermal region toward the upper side of the ground surface, and it is possible to improve convenience when construction work is executed.

Steam in the steam extraction pipe moves to the turbine having a pressure gradient, and then expands inside the turbine so as to serve as power that rotates the turbine. Steam that has flowed out of the turbine returns to water in the condenser, and is again sent to the water injection pipe. The quantity of circulation water is equal to the quantity of steam required by the turbine, and therefore an extremely small quantity of water to be circulated is merely required. This process is repeatedly performed, and, as a result, geothermal energy is extracted efficiently and continuously.

A geothermal exchange is performed according to this method, thus making it possible to perform a heat exchange in which heat loss suffered when steam passes through the low-temperature region is small, in which pipe loss suffered by friction caused when steam passes on the surface of the pipe is small, and in which the amount of water to be circulated can be reduced.

The boiling-water-type geothermal heat exchanger of the present invention can be configured such that the diameter of the steam extraction pipe stepwisely becomes smaller from the lower side of the geothermal region toward the upper side of the ground surface.

Additionally, the boiling-water-type geothermal heat exchanger of the present invention can be configured such that the diameter of the steam extraction pipe continuously becomes smaller from the lower side of the geothermal region toward the upper side of the ground surface.

The boiling-water-type geothermal heat exchanger of the present invention can be configured such that an air layer is formed at the upper part of the water injection pipe by lowering the water level of water that is supplied to the water injection pipe, and a heat insulating portion defined thereby is provided in a region contiguous to a low-temperature region closer to the ground surface.

There is a case in which the pressure of water that is supplied to the geothermal heat exchanger installed underground is too large, which depends on a geothermal layer to be bored, and if there is a need to lower this water pressure, pressure in the geothermal heat exchanger is adjustable by lowering the water level of the water injection pipe. This makes it possible to form an air layer at the upper part of the water injection pipe, and makes it possible to obtain a heat insulating effect by means of the air layer having high heat insulating properties. In particular, if the depth of a borehole in a high-temperature region is large, an air layer can be formed in the water injection pipe contiguous to the low-temperature region closer to the ground surface by lowering the water level of water that is supplied to the water injection pipe.

The boiling-water-type geothermal heat exchanger of the present invention can be configured such that a pressure pump to pressurize water that is supplied to the water injection pipe is disposed on the ground.

When bulk power generation is conducted, the quantity of circulation water becomes large, and, as a result, the head loss of an outer pipe part becomes large, and yet the equivalent of the head loss can be supplied by employing a configuration in which a pressure pump to pressurize water that is supplied to the water injection pipe is disposed on the ground, and higher pressure than when natural water pressure is used can be obtained, thus making it possible to achieve bulk power generation. Additionally, steam pressure can be heightened by employing a configuration in which a pressure pump to pressurize water that is supplied to the water injection pipe is disposed on the ground, and therefore the boiling-water-type geothermal heat exchanger of the present invention is widely applicable to unused high-temperature geothermal regions of the whole country.

The boiling-water-type geothermal heat exchanger of the present invention can be configured such that an insertion pipe consisting of a combination of at least one of the water injection pipes and at least one of the steam extraction pipes is inserted into a plurality of geothermal wells, and outlets of the steam extraction pipes are connected in parallel, and portions of steam obtained by use of the geothermal wells are collected in an aggregate manner, and a steam header that equalizes the pressure of the thus collected steam is provided.

Differences in both temperature and pressure occur depending on boring places, and therefore, if these are used for power generation, the outputs of power generation with respect to one geothermal well will differ from each other. Therefore, the outlets of the steam extraction pipes of the insertion pipe are connected in parallel with respect to the plurality of geothermal wells, and portions of steam obtained by use of the geothermal wells are collected in an aggregate manner, and therefore, advantageously, a turbine, a condenser, a power generator, a transformer, etc., can be designed to be larger in capacity, and the efficiency of a power plant is increased as a whole. Additionally, the pressure of the thus collected steam can be equalized by disposing the steam header.

The boiling-water-type geothermal heat exchanger of the present invention can be configured such that the geothermal well is incident to existing equipment.

Without newly conducting a boring operation, energy produced by hot water can be extracted by using and inserting an insertion pipe consisting of a combination of the water injection pipe and the steam extraction pipe into a geothermal well that is incident to existing equipment and that is empty or is out of service. In particular, it is possible to reduce the diameter of the insertion pipe by extracting steam from the ground in the form of a steam single-phase flow, and hence is possible to raise the degree of freedom of a usable geothermal well.

The boiling-water-type geothermal power generation equipment of the present invention is characterized in that power generation is conducted by use of the boiling-water-type geothermal heat exchanger of the present invention.

Additionally, the boiling-water-type geothermal power generation equipment of the present invention can conduct the power generation according to a binary system.

The boiling-water-type geothermal heat exchanger of the present invention is capable of restraining the occurrence of pressure loss or heat loss in piping, is capable of making the diameter of a pipe to be buried in the ground smaller, is capable of reducing the amount of water to be circulated, and is superior in heat exchange efficiency, and therefore the use of this geothermal heat exchanger makes it possible to conduct efficient geothermal power generation while effectively using a geothermal well incident to existing equipment, and hence makes it possible to realize geothermal power generation equipment that is high in convenience.

Effects of the Invention

According to the present invention, it is possible to realize a boiling-water-type geothermal heat exchanger and boiling-water-type geothermal power generation equipment that are capable of restraining a heat exchange between high-temperature steam to be extracted and water to be fed or an underground low-temperature region as much as possible and that are capable of lightening the weight of piping.

DETAILED DESCRIPTION OF THE PREFERRED EMBODIMENTS

A boiling-water-type geothermal heat exchanger and boiling-water-type geothermal power generation equipment of the present invention will be hereinafter described based on an embodiment thereof.

Figure 1:
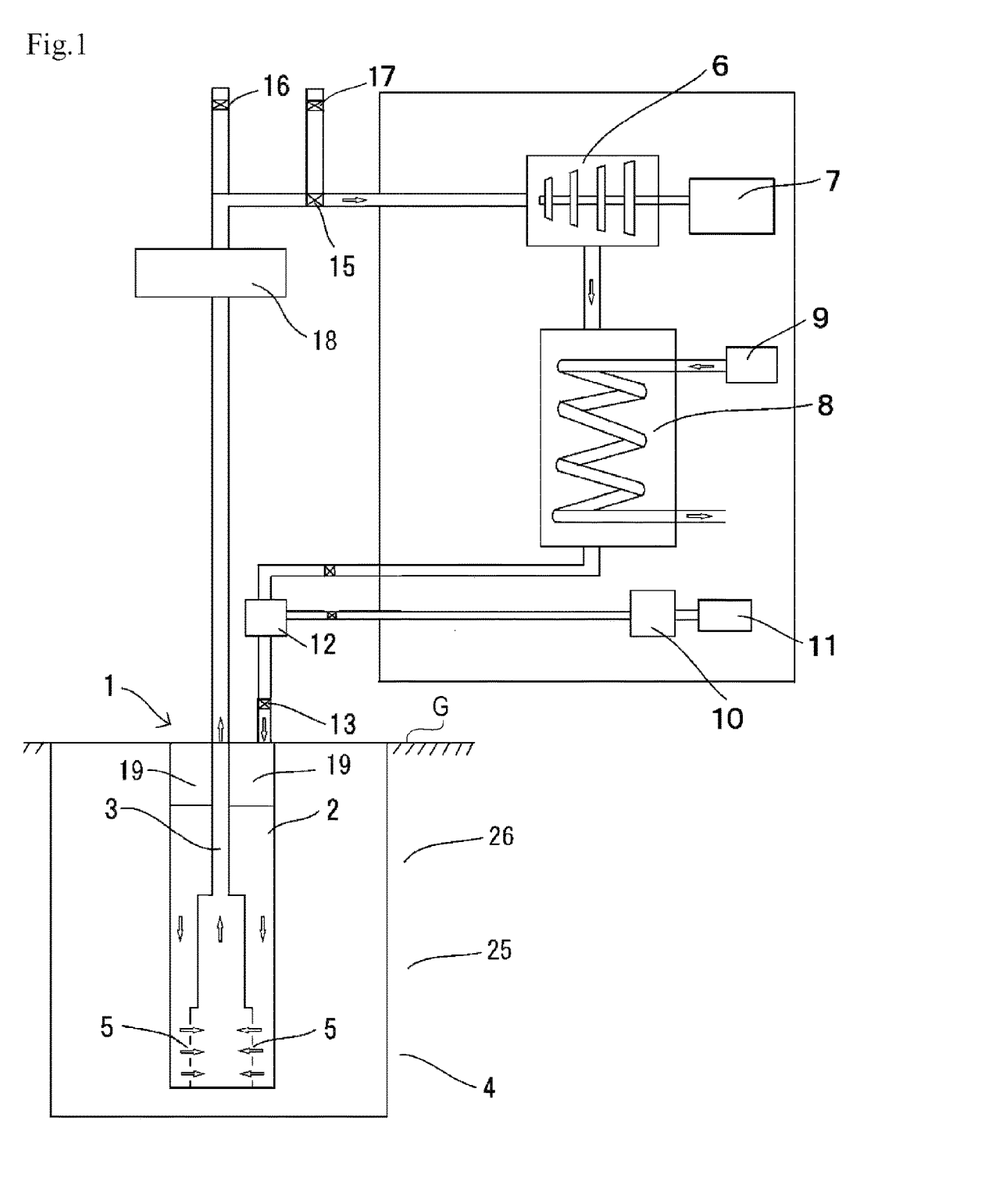
FIG. 1 is a view showing a boiling-water-type geothermal heat exchanger and boiling-water-type geothermal power generation equipment according to a first embodiment of the present invention.

The boiling-water-type geothermal heat exchanger and the boiling-water-type geothermal power generation equipment according to the embodiment of the present invention are shown in FIG. 1.

In FIG. 1, the geothermal heat exchanger 1 includes a water injection pipe 2 that is installed underground and to which water is supplied from above ground and a steam extraction pipe 3 that is installed underground so as to be contiguous to the water injection pipe 2. In FIG. 1, a double pipe structure is employed in which the water injection pipe 2 serves as an outer pipe closer to the side of a geothermal region 4, and the steam extraction pipe 3 serves as an inner pipe disposed inside the water injection pipe 2.

The steam extraction pipe 3 has a plurality of gushing ports 5 bored in its lower part, and the water injection pipe 2 and the steam extraction pipe 3 are each brought into an open state by means of these gushing ports 5. In other words, the gushing ports 5 are disposed at the boundary between the water injection pipe 2 and the steam extraction pipe 3. The steam extraction pipe 3 is connected to a turbine 6, and the pressure inside the steam extraction pipe 3 is decreased approximately to pressure required by the turbine 6.

Water supplied to the water injection pipe 2 by use of the natural difference in depth of water is pressurized substantially proportionally to the depth from the ground near the bottom of the water injection pipe 2, and becomes high-temperature pressurized water by heat supplied from the geothermal region 4. The inside of the steam extraction pipe 3 is in a depressurized state, and therefore, by using this pressure difference, high-temperature pressurized water gushes from the gushing ports 5 into the steam extraction pipe 3 in an atomized state as shown by the arrows, and is vaporized by using a pressure difference between pressure required by the turbine 6 and pressure at the bottom of the water injection pipe 2, and is converted into a steam single-phase flow. The steam single-phase flow generated underground moves to the turbine 6 because of a pressure difference between the steam extraction pipe 3 and the turbine 6, and then expands inside the turbine 6 so as to serve as power that rotates the turbine 6. This power allows a power generator 7 to generate electricity.

Steam that has flowed out of the turbine 6 is thereafter cooled by cooling water 9 in a condenser 8, and returns to water, and is again supplied to the water injection pipe 2. The quantity of circulation water is equal to the quantity of steam required by the turbine 6, and therefore an extremely small quantity of water to be circulated is merely required. This process is repeatedly performed, and, as a result, geothermal energy is continuously extracted. When needed, makeup water 11 is resupplied from a makeup water tank 12 through a water treatment apparatus 10. The water level of makeup water is adjusted by a makeup water control valve 13. A steam header 18 and a steam control valve 15 are provided between the steam extraction pipe 3 and the turbine 6. Besides, a pressure control valve 17 is provided.

The steam header 18 is used in such a case as to collectively supply steam produced from a plurality of geothermal wells to the single turbine 6, and this makes it possible to equalize pressure. In addition to the present embodiment in which natural water pressure is utilized, it is possible to use the steam header 18 in another embodiment described later in which water to be supplied to the water injection pipe is pressurized on the ground.

If an accident to a piece of main equipment, such as the turbine 6 or the power generator 7, or an accident to a power transmission system occurs, a breaker of the power generator 7 will operate, and, if so, in order to prevent pressure from being rapidly increased in the geothermal heat exchanger 1, an emergency pressure reducing valve 16 is operated, thus making it possible to prevent a rapid increase in pressure in the geothermal heat exchanger 1. It is possible for the geothermal heat exchanger 1 to automatically adjust to an ordinary load change of the power generator. When a load of the power generator rises, pressure inside the geothermal heat exchanger 1 falls, and therefore the amount of steam generated thereby increases. When a load of the power generator falls, pressure inside the geothermal heat exchanger 1 rises, and therefore the amount of steam generated thereby decreases. The fact of having this series of automatic generation-amount control functions is also mentioned as one feature.

The steam extraction pipe 3 is formed such that the diameter of the steam extraction pipe 3 becomes smaller from the lower side of the geothermal region toward the upper side of the ground surface G. FIG. 1 shows a configuration that is its first embodiment in which the diameter of the steam extraction pipe 3 stepwise becomes smaller from the lower side of the geothermal region toward the upper side of the ground surface G. The diameter of its part in the area of the intermediate-temperature region 25 is made smaller, and the diameter of its part in the area of the low-temperature region 26 is made even smaller than the diameter of its part in the geothermal region 4 that is a high-temperature region. That of FIG. 1 is one example, and the number of places at which the pipe diameter becomes smaller is not limited to the number shown here.

Figure 2:
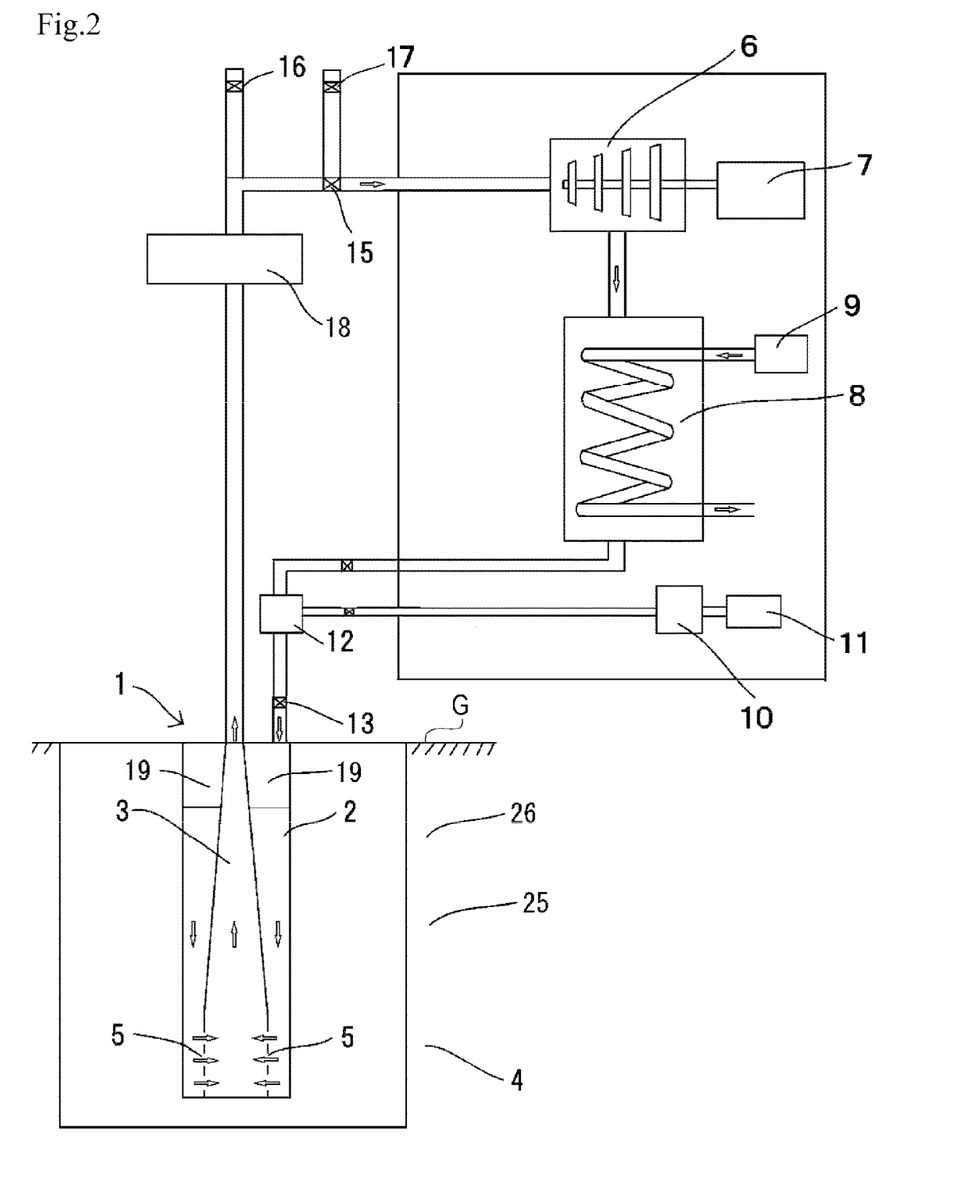
FIG. 2 is a view showing a boiling-water-type geothermal heat exchanger and boiling-water-type geothermal power generation equipment according to a second embodiment of the present invention.

Additionally, FIG. 2 shows a configuration that is its second embodiment in which the diameter of the steam extraction pipe 3 continuously becomes smaller from the lower side of the geothermal region toward the upper side of the ground surface G. In FIG. 2, an example is illustrated in which the rate of a decrease in diameter is constant, and is linearly decreased with a predetermined inclination from the geothermal region 4 that is a high-temperature region to the low-temperature region 26 through the intermediate-temperature region 25, and yet the rate of a decrease in diameter is not necessarily required to be constant, and may be decreased in a curved manner. Additionally, a combination of a stepwise decrease in diameter and a continuous decrease in diameter may be employed.

The steam extraction pipe 3 is formed such that the diameter of the steam extraction pipe 3 becomes smaller from the lower side of the geothermal region toward the upper side of the ground surface G, and, as a result, when a steam single-phase flow rises inside the steam extraction pipe 3, its speed becomes higher in proportion to an approach to the low-temperature region closer to the ground surface G, and a period of time spent in passing therethrough is shortened. The amount of heat that is thermally exchanged between the steam extraction pipe 3 and the water injection pipe 2 that is an outer pipe decreases in proportion to the cube of the diameter of the steam extraction pipe 3 that is an inner pipe, and therefore it is possible to reduce heat loss suffered when a steam single-phase flow passes through the low-temperature region.

Additionally, if the steam extraction pipe 3 that is an inner pipe is attached after the water injection pipe 2 that is an outer pipe is installed, it is possible to make the weight of the steam extraction pipe 3 smaller than in a case in which the steam extraction pipe 3 is formed so as to have the same diameter as its own diameter on the lower side of the geothermal region because the diameter of the steam extraction pipe 3 becomes smaller from the lower side of the geothermal region toward the upper side of the ground surface G, and it is possible to improve convenience when construction work is executed.

As thus described, in the boiling-water-type geothermal heat exchanger of the present invention, water supplied to the water injection pipe 2 while utilizing the natural difference in depth of water descends, and is heated from the geothermal region 4 therearound, and hence becomes high-temperature pressure water at the lower part of the water injection pipe 2. This high-temperature and high-pressure water gushes in an atomized state from the lower part of the water injection pipe 2 to the steam extraction pipe 3 through the gushing ports 5. At the lower part of the steam extraction pipe 3, the atomized water is vaporized by utilizing a difference in pressure between saturation pressure that is slightly higher than pressure required by the turbine 6 and pressure at the bottom of the water injection pipe 2. Pressure at the upper part of the steam extraction pipe 3 is set to be slightly higher than pressure required by the turbine 6, and it is possible to substantially automatically maintain constant pressure while balancing with the load of the power generator 7 that is the load of the turbine 6. A difference in pressure between the lower part of the water injection pipe 2 and the turbine 6 is extremely large, and therefore it becomes possible to continuously produce steam having pressure/flow rate required by the turbine 6. Although steam flows out of the turbine 6, and is then cooled by the condenser 8, and returns to water, and is again sent to the water injection pipe 2, a pressure pump is not indispensable for supplying water to the upper part of the water injection pipe 2 because the quantity of circulation water is equal to the quantity of steam required by the turbine 6 and hence is extremely small.

In the present invention, a pressure gradient is formed by sending highly treated water to the lowest part of the water injection pipe 2 while utilizing the pressure of nature. The pressure at the upper part of the steam extraction pipe 3 is inlet pressure required by the turbine 6, and the pressure loss of the inside of the steam extraction pipe 3 and the pressure loss of piping respectively have numerical values smaller by one digit than the inlet pressure, and therefore, theoretically, the depth of a borehole is merely required to have a distance equivalent to the pressure required by the turbine 6, and this is applicable in a high-temperature district of the geothermal region.

If the depth of a borehole in a high-temperature region is large, an air layer 19 is formed in the water injection pipe 2 contiguous to the low-temperature region 26 closer to the ground surface G by lowering the water level of highly treated water that is supplied to the water injection pipe 2, and therefore this makes it possible to improve a heat insulating effect. Additionally, a surface of the lower part of the water injection pipe 2 contiguous to the high-temperature region is made to easily absorb geothermal energy by employing a material superior in thermal conductivity.

The plurality of gushing ports 5 provided at the lower part of the steam extraction pipe 3 are formed by boring small-diameter holes, and the opening diameter of each port, the number of ports, and the flow velocity through each port are individually designed depending on a power generation capacity and the temperature and depth of a borehole. As an example, it is possible to provide a hundred gushing ports 5 each of which is 2 mm in diameter when the diameter of the water injection pipe 2 is set at 165.2 mm and when the diameter of the steam extraction pipe 3 is set at 89.1 mm.

The geothermal heat exchanger 1 can be configured such that an insertion pipe consisting of a combination of at least one water injection pipe 2 and at least one steam extraction pipe 3 is inserted into a plurality of geothermal wells, and outlets of the steam extraction pipes 3 are connected in parallel, and portions of steam obtained by use of the geothermal wells are collected in an aggregate manner, and the steam header 18 equalizes the pressure of the thus collected steam.

Although this is usable by inserting one insertion pipe into one geothermal well, differences in both temperature and pressure occur depending on boring places, and therefore, if this is used for power generation, the outputs of power generation with respect to one geothermal well will differ from each other. Therefore, the outlets of the steam extraction pipes 3 of the insertion pipe are connected in parallel with respect to the plurality of geothermal wells, and portions of steam obtained by use of the geothermal wells are collected in an aggregate manner, and therefore, advantageously, a turbine, a condenser, a power generator, a transformer, etc., can be designed to be larger in capacity, and the efficiency of a power plant is increased as a whole. Additionally, the pressure of the thus collected steam can be equalized by disposing the steam header 18, and steam whose pressure has been equalized can be supplied to the single turbine.

For example, in a case in which three geothermal wells are used, when a first well is 500 kW, a second well is 400 kW, and a third well is 600 kW as a result of the conversion of heat output at each geothermal well into power generator output, if the outputs of these three wells are totaled and are designed as one unit of "first well+second well+third well=1500 kW" without allowing a power generating system to be constructed in a three-unit independent manner, it is possible to design the turbine, the condenser, the power generator, and the transformer to be larger in capacity even if the entire output is the same, and the efficiency of the entire power plant will be improved when this is used for power generation because the efficiency of an electric apparatus is improved in accordance with its capacity. Additionally, it is possible to significantly reduce building costs, such as construction cost.

Additionally, in the geothermal heat exchanger 1, a newly constructed geothermal well can be used, and, in addition, an insertion pipe consisting of a combination of the water injection pipe 2 and the steam extraction pipe 3 can be used by being inserted into a geothermal well that is incident to existing equipment, such as an existing geothermal power plant, and that is empty or is out of service. In particular, it is possible to reduce the diameter of the insertion pipe by extracting steam from the ground in the form of a steam single-phase flow, and hence is possible to facilitate the effective use of an existing geothermal well as a result of a rise in the degree of freedom of a usable geothermal well.

Accordingly, it is possible to greatly shorten a period of time required for an environmental assessment by replacing existing boreholes including an idle borehole, and is possible to greatly reduce development costs. Additionally, a reserve borehole, which is required in conventional geothermal power generation, is unnecessary. Additionally, a geothermal fluid is never used, and therefore scale corrosion reaches the same level as that of ordinary water piping/equipment, and, conveniently, full satisfaction can be obtained by the maintenance frequency of generally-used industrial apparatuses, and concerns about the depletion of hot spring sources are wiped off, and environmental problems are dramatically mitigated.

In the boiling-water-type geothermal heat exchanger of the present invention, a steam generator, which is a pressure container ordinarily disposed on the ground, is unnecessary because steam is generated underground. Therefore, construction costs for the steam generator is unnecessary, and it is possible to design the control of the entire system more simply. Additionally, a steam generator is not required to be disposed, and therefore an engineer who handles a pressure container is unnecessary, and it is possible to reduce the number of maintenance workers, thus making it possible to reduce operating costs.

Additionally, in the boiling-water-type geothermal heat exchanger of the present invention, the pressure pump to forcefully feed groundwater is no longer indispensable, and therefore it is possible to reduce costs required to install the pressure pump. Additionally, it is possible to design the control of the entire system more simply. Additionally, the steam generator is unnecessary, and the pressure pump is not indispensable, and therefore it is possible to reduce an installation site for ground equipment. Many geothermal regions exist in national parks, and it is possible to reduce an environmental burden when power generation facilities are constructed there.

In the present invention, it is possible to restore a borehole by supplying water from above ground to the deepest part of the borehole on the condition that there is constant heat in the deepest zone of a borehole regardless of whether it is an existing borehole for power generation or for hot-spring resorts. In this case, ordinary piping is fully satisfactorily usable as a water supply pipe.

Figure 3:
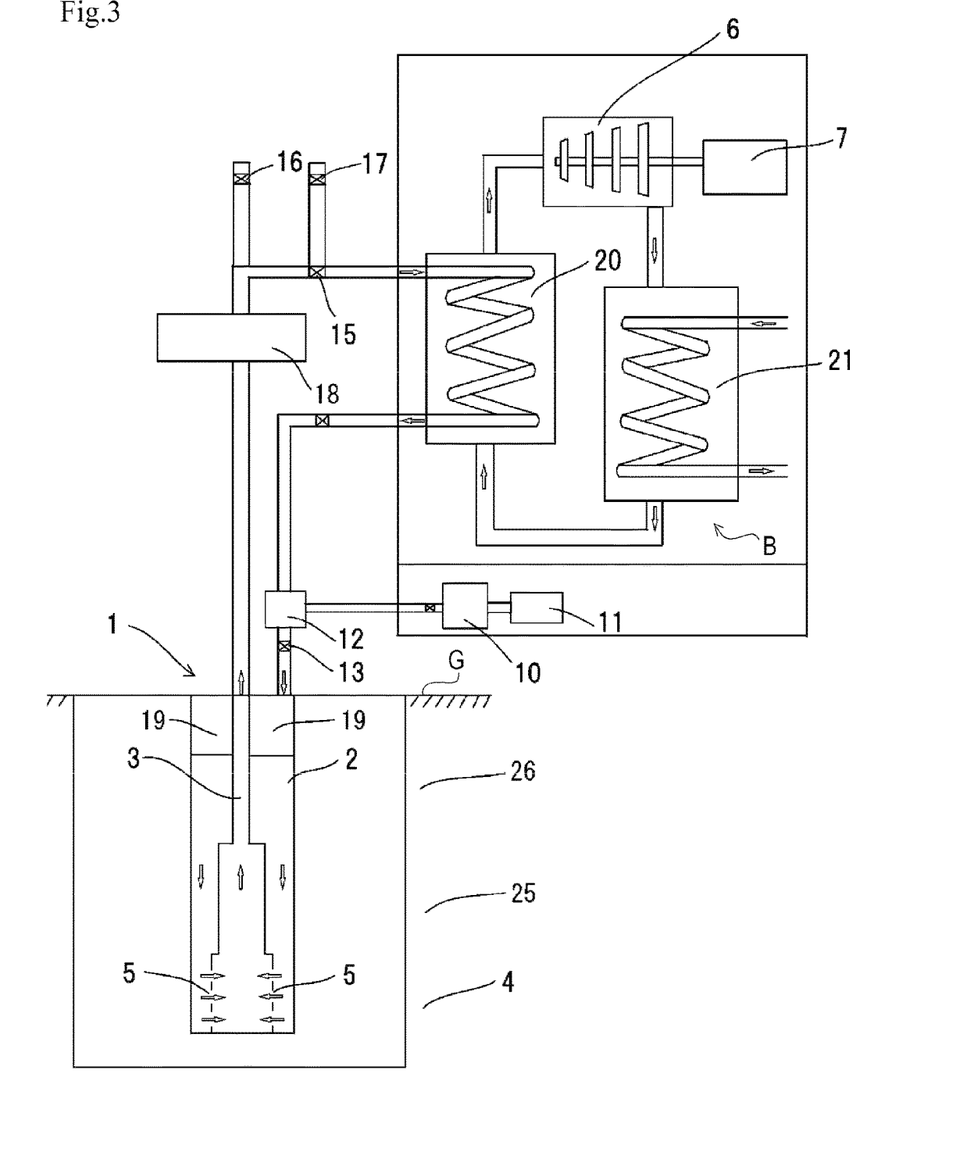
FIG. 3 is a view showing a configuration of boiling-water-type geothermal power generation equipment in which a boiling-water-type geothermal heat exchanger of the present invention is applied to power generation according to a binary system.

FIG. 3 shows a configuration of boiling-water-type geothermal power generation equipment in which the boiling-water-type geothermal heat exchanger of the present invention is applied to the power generation of a binary system B.

In FIG. 3, the function of the geothermal heat exchanger 1 is the same as that of the heat exchanger described with reference to FIG. 1, and a steam single-phase flow extracted from the steam extraction pipe 3 of the geothermal heat exchanger 1 is sent to a vaporizer 20, and heats a low-boiling-point medium. The low-boiling-point medium heated thereby is turned into low-boiling-point medium steam, and moves to the turbine 6, and serves as power that rotates the turbine 6. This power allows the power generator 7 to generate electricity.

Thereafter, the low-boiling-point medium steam that has flowed out of the turbine 6 is cooled with cooling water by means of a condenser 21, and returns to the low-boiling-point medium, and is sent to the vaporizer 20. This is repeatedly performed, and power generation is continuously conducted. When needed, makeup water 11 is resupplied from the makeup water tank 12 through the water treatment apparatus 10. The water level of makeup water is adjusted by the makeup water control valve 13. The steam header 18 and the steam control valve 15 are provided between the steam extraction pipe 3 and the turbine 6.

Although the geothermal heat exchanger 1 of the embodiment shown in FIG. 1 is used and shown in FIG. 3, power generation according to the binary system B can also be conducted by use of the geothermal heat exchanger 1 of the embodiment shown in FIG. 2.

Although the embodiments carried out by natural water pressure have been described above, a configuration can also be formed such that a pressure pump to pressurize water that is supplied to the water injection pipe 2 is disposed on the ground.

When bulk power generation is conducted, the quantity of circulation water becomes large, and, as a result, the head loss of an outer pipe part becomes large, and yet the equivalent of the head loss can be supplied by employing a configuration in which a pressure pump to pressurize water that is supplied to the water injection pipe 2 is disposed on the ground, and higher pressure than when natural water pressure is used can be obtained, thus making it possible to achieve bulk power generation. Additionally, steam pressure can be heightened by employing that configuration in which a pressure pump to pressurize water that is supplied to the water injection pipe 2 is disposed on the ground, and therefore the boiling-water-type geothermal heat exchanger of the present invention is widely applicable to unused high-temperature geothermal regions of the whole country.

A description will be hereinafter given of an embodiment in which water that is supplied to the water injection pipe is pressurized on the ground.

Figure 4:
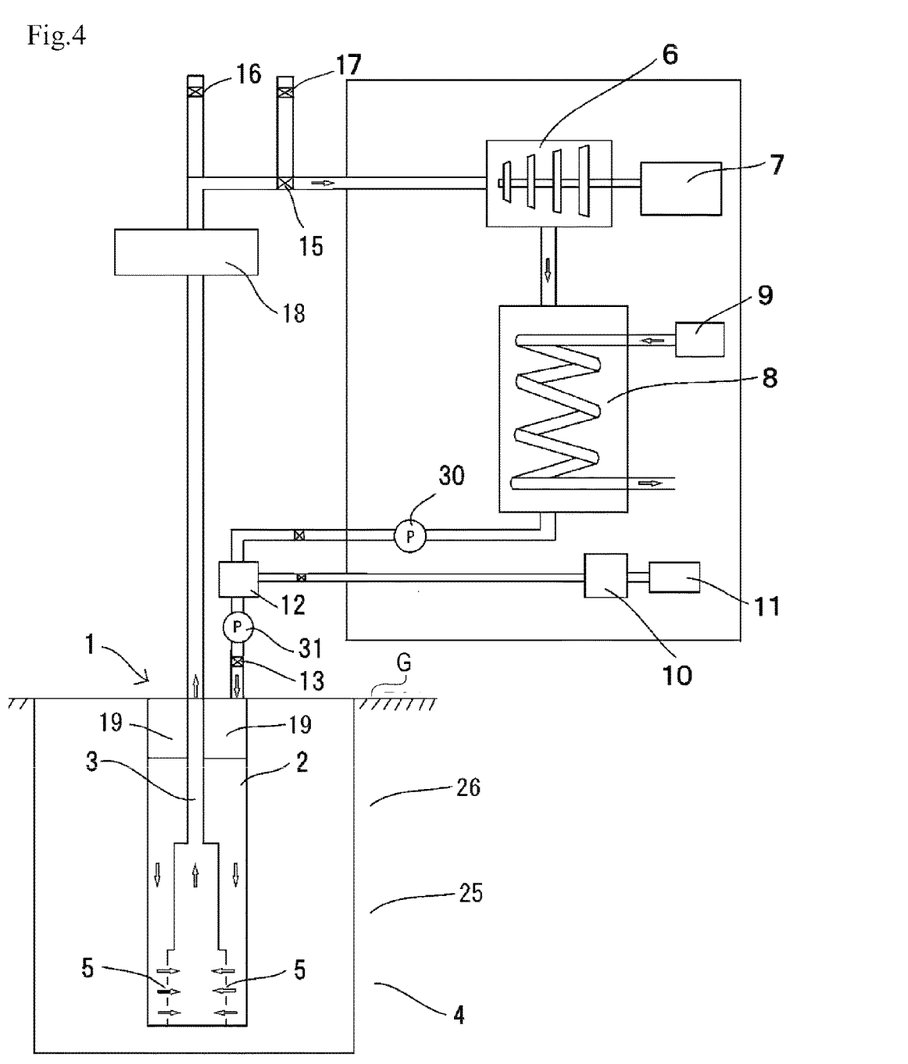
FIG. 4 is a view showing a boiling-water-type geothermal heat exchanger and boiling-water-type geothermal power generation equipment according to an embodiment in which water that is supplied to a water injection pipe is pressurized on the ground.

FIG. 4 shows a boiling-water-type geothermal heat exchanger and boiling-water-type geothermal power generation equipment according to this embodiment.

In FIG. 4, the geothermal heat exchanger 1 includes a water injection pipe 2 that is installed underground and to which water is supplied from above ground and a steam extraction pipe 3 that is installed underground so as to be contiguous to the water injection pipe 2. A double pipe structure is employed in which the water injection pipe 2 serves as an outer pipe closer to the side of a geothermal region 4, and the steam extraction pipe 3 serves as an inner pipe disposed inside the water injection pipe 2.

The steam extraction pipe 3 has a plurality of gushing ports 5 bored in its lower part, and the water injection pipe 2 and the steam extraction pipe 3 are each brought into an open state by means of these gushing ports 5. In other words, the gushing ports 5 are disposed at the boundary between the water injection pipe 2 and the steam extraction pipe 3. The steam extraction pipe 3 is connected to a turbine 6, and the pressure inside the steam extraction pipe 3 is decreased approximately to pressure required by the turbine 6.

A pressure pump 31 to pressurize water that is supplied to the water injection pipe 2 is disposed on the ground. Water that is supplied to the water injection pipe 2 is pressurized by the pressure pump 31 on the ground, and hence, in the lower part of the water injection pipe 2, becomes pressure water having pressure obtained by totaling pressure that is obtained by being pressurized by the pressure pump 31 and pressure that is substantially proportional to the depth from above ground.

The steam extraction pipe 3 is formed such that the diameter of the steam extraction pipe 3 becomes smaller from the lower side of the geothermal region toward the upper side of the ground surface G. Although FIG. 4 shows a structure in which the diameter of the steam extraction pipe 3 stepwisely becomes smaller from the lower side of the geothermal region toward the upper side of the ground surface G, another structure can be employed in which the diameter of the steam extraction pipe 3 continuously becomes smaller from the lower side of the geothermal region toward the upper side of the ground surface G.

The pressure water is supplied with heat from the geothermal region 4, and becomes high-temperature pressurized water. The inside of the steam extraction pipe 3 is in a depressurized state, and therefore, by using this pressure difference, the high-temperature pressurized water gushes from the gushing ports 5 into the steam extraction pipe 3 in an atomized state as shown by the arrows, and is vaporized by using a pressure difference between pressure required by the turbine 6 and pressure at the bottom of the water injection pipe 2, and is converted into a steam single-phase flow. The steam single-phase flow generated underground moves to the turbine 6 because of a pressure difference between the steam extraction pipe 3 and the turbine 6, and then expands inside the turbine 6 so as to serve as power that rotates the turbine 6. This power allows a power generator 7 to generate electricity.

Steam that has flowed out of the turbine 6 is thereafter cooled by cooling water 9 in a condenser 8, and returns to water, and is again supplied to the water injection pipe 2. The quantity of circulation water is equal to the quantity of steam required by the turbine 6, and therefore an extremely small quantity of water to be circulated is merely required. This process is repeatedly performed, and, as a result, geothermal energy is continuously extracted. When needed, makeup water 11 is resupplied from a makeup water tank 12 through a water treatment apparatus 10. An extraction pump 30 is disposed between the condenser 8 and the makeup water tank 12. The water level of makeup water is adjusted by a makeup water control valve 13. A steam header 18 and a steam control valve 15 are provided between the steam extraction pipe 3 and the turbine 6. Besides, a pressure control valve 17 is provided.

As described above, in the present invention, the steam extraction pipe is formed such that the diameter of the steam extraction pipe becomes smaller from the lower side of the geothermal region toward the upper side of the ground surface, and therefore the present invention is greatly characterized in that, when a steam single-phase flow rises inside the steam extraction pipe, its speed becomes higher in proportion to an approach to the low-temperature region closer to the ground surface, and a period of time spent in passing therethrough is shortened, and characterized in that heat loss suffered when a steam single-phase flow passes through the low-temperature region is reduced, and, as a result, great advantages are provided.

INDUSTRIAL APPLICABILITY

The present invention is capable of restraining the occurrence of pressure loss or heat loss in piping, is capable of making the diameter of a pipe to be buried in the ground smaller, is capable of reducing the amount of water to be circulated, and is capable of being widely used as a boiling-water-type geothermal heat exchanger and boiling-water-type geothermal power generation equipment that are superior in heat exchange efficiency. In particular, the present invention is remarkably excellent, for example, in the fact that existing boreholes can be effectively used and in the fact that an environmental burden can be reduced when power generation facilities are constructed, and the present invention greatly contributes to industrial application in consideration of the present situation in which the energy policy of our country that has been heavily dependent on nuclear power is compelled to be fundamentally reviewed because of a nuclear power plant accident.

DESCRIPTION OF REFERENCE NUMERALS

1 Geothermal heat exchanger
2 Water injection pipe
3 Steam extraction pipe
4 Geothermal region
5 Gushing port
6 Turbine
7 Power generator
8 Condenser
9 Cooling water
10 Water treatment apparatus
11 Makeup water
12 Makeup water tank
13 Makeup water control valve
15 Steam control valve
16 Emergency pressure reducing valve
17 Pressure control valve
18 Steam header
19 Air layer
20 Vaporizer
21 Condenser
25 Intermediate-temperature region
26 Low-temperature region
30 Extraction pump
31 Pressure pump
G Ground surface

What is claimed is:

1. A geothermal heat exchanger comprising:

a water injection pipe installed underground and receiving water supplied from above ground; and a steam extraction pipe installed underground and contiguous to the water injection pipe, wherein the steam extraction pipe comprises a plurality of gushing ports;

wherein pressure in the steam extraction pipe is decreased to an approximate pressure required by a turbine;

an underground geothermal region supplying heat to water present in the water injection pipe to convert said water into a high-pressure hot water, wherein said high-pressure hot water is converted into a steam single-phase flow via the plurality of gushing ports and subsequently extracted from underground via the steam extraction pipe;

wherein the steam extraction pipe is disposed inside the water injection pipe, and the steam extraction pipe is formed such that a diameter of the steam extraction pipe decreases in a downstream direction between the underground geothermal region and a ground surface; and a heat insulating portion in a region contiguous to a low-temperature region closer to the ground surface, wherein the heat insulating portion is created by formation of an air layer at an upper part of the water injection pipe by lowering a water level of the water that is supplied to the water injection pipe.

2. The geothermal heat exchanger according to claim 1, wherein the diameter of the steam extraction pipe stepwisely decreases in the downstream direction between the underground geothermal region and the ground surface.

3. The geothermal heat exchanger according to claim 1, wherein the diameter of the steam extraction pipe continuously decreases in the downstream direction between the underground geothermal region and the ground surface.

4. The geothermal heat exchanger according to claim 1, wherein a pressure pump to pressurize water that is supplied to the water injection pipe is disposed on the ground.

5. The geothermal heat exchanger according to claim 1, wherein an insertion pipe consisting of a combination of at least one of the water injection pipe and at least one of the steam extraction pipe is inserted into a plurality of geothermal wells, and outlets of the steam extraction pipes are connected in parallel, and portions of steam obtained by use of the geothermal wells are collected in an aggregate manner, and a steam header that equalizes the pressure of the thus collected steam is provided.

6. The geothermal heat exchanger according to claim 5, wherein the plurality of geothermal wells are incident to existing equipment.

7. Geothermal power generation equipment characterized by conducting power generation by use of the geothermal heat exchanger according to claim 1.

8. The geothermal power generation equipment according to claim 7, wherein the power generation is conducted according to a binary system.

* * * * *